(12) United States Patent
Lee

(10) Patent No.: US 9,791,078 B2
(45) Date of Patent: Oct. 17, 2017

(54) CONNECTOR ASSEMBLY FOR CONNECTING PIPES

(71) Applicant: JUNGWOO Metal Ind. Co., Ltd., Yangju-si, Gyeonggi-do (KR)

(72) Inventor: Kwang Won Lee, Yangju-si (KR)

(73) Assignee: JUNGWOO METAL IND. CO., LTD., Gyeonggi-Do (KR)

( * ) Notice: Subject to any disclaimer, the term of this patent is extended or adjusted under 35 U.S.C. 154(b) by 39 days.

(21) Appl. No.: 14/648,192

(22) PCT Filed: Aug. 28, 2014

(86) PCT No.: PCT/KR2014/008036
§ 371 (c)(1),
(2) Date: May 28, 2015

(87) PCT Pub. No.: WO2015/030506
PCT Pub. Date: Mar. 5, 2015

(65) Prior Publication Data
US 2015/0308595 A1    Oct. 29, 2015

(30) Foreign Application Priority Data

Aug. 29, 2013  (KR) ..................... 10-2013-0103153
Mar. 10, 2014  (KR) ..................... 10-2014-0027821

(51) Int. Cl.
*F16L 21/03*  (2006.01)
*F16L 21/06*  (2006.01)
(Continued)

(52) U.S. Cl.
CPC ............ *F16L 21/06* (2013.01); *F16L 13/142* (2013.01); *F16L 21/002* (2013.01); *F16L 21/03* (2013.01); *F16L 21/08* (2013.01); *F16L 37/091* (2013.01)

(58) Field of Classification Search
CPC ...... F16L 37/091; F16L 13/142; F16L 13/141
(Continued)

(56) References Cited

U.S. PATENT DOCUMENTS 1,927,390 A * 9/1933 Church ................. F16L 19/075
                                                          285/340
3,432,189 A * 3/1969 Buller .................... F16L 21/022
                                                          285/340
(Continued)

FOREIGN PATENT DOCUMENTS

DE   WO 2010089188 A1 *  8/2010 ............ F16L 13/142
EP         1659325           5/2006
(Continued)

*Primary Examiner* — David E Bochna
(74) *Attorney, Agent, or Firm* — Workman Nydegger

(57) ABSTRACT

Provided are connector assemblies for connecting pipes. For example, a connector assembly can include a connector formed with a hollow into which a pipe is inserted. A large diameter portion on at least one side of both end portions of the hollow where the large diameter portion is formed has a relatively large inner diameter and a housing space inside. The connector assembly also includes a ring-shaped sealing member provided in the hosing space and a grip member provided adjacent to the sealing member in the housing space. Further, the grip member has a body portion formed to contact an inner circumferential surface of the large diameter portion and a pair of sharp portions formed to be bent from both sides of the body portion and to partially bite into the outer circumferential surface of the pipe by crimping the outer circumferential surface of the large diameter portion.

20 Claims, 15 Drawing Sheets

(51) Int. Cl.
*F16L 13/14* (2006.01)
*F16L 21/00* (2006.01)
*F16L 37/091* (2006.01)
*F16L 21/08* (2006.01)

(58) Field of Classification Search
USPC .................................................. 285/382, 340
See application file for complete search history.

(56) References Cited

U.S. PATENT DOCUMENTS

| | | | | |
|---|---|---|---|---|
| 3,917,324 A | * | 11/1975 | Wakatsuki | ............... F16L 19/12 |
| | | | | 285/341 |
| 4,084,843 A | | 4/1978 | Gassert | |
| 4,819,974 A | * | 4/1989 | Zeidler | ................ F16L 17/025 |
| | | | | 285/382.7 |
| 6,805,385 B2 | * | 10/2004 | Viegener | ............... F16L 37/091 |
| | | | | 285/340 |
| 7,316,429 B2 | * | 1/2008 | Viegener | ............... F16L 37/091 |
| | | | | 285/340 |
| 8,585,100 B2 | * | 11/2013 | Stults | .................... F16L 13/142 |
| | | | | 285/382 |
| 8,925,978 B2 | * | 1/2015 | Jamison | ................ F16L 37/091 |
| | | | | 285/382 |
| 2009/0194990 A1 | * | 8/2009 | Williams | .............. F16L 37/091 |
| | | | | 285/23 |
| 2013/0043677 A1 | | 2/2013 | Gibson | |
| 2015/0285420 A1 | * | 10/2015 | Stout | .................... F16L 37/091 |
| | | | | 285/346 |

FOREIGN PATENT DOCUMENTS

KR   10-2010-0083946   7/2010
KR   10-1196158   11/2012

* cited by examiner

[Fig. 1]
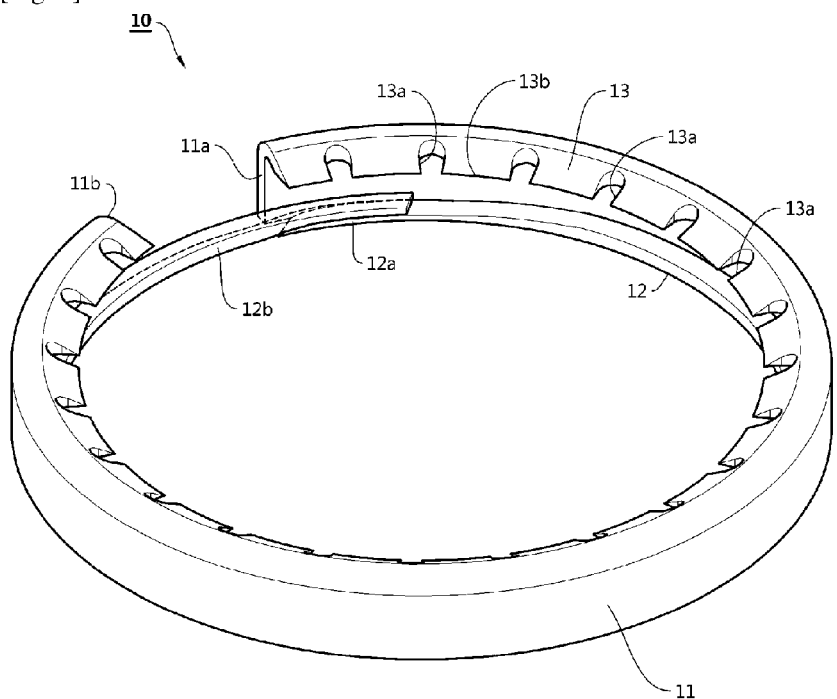
[Fig. 2]
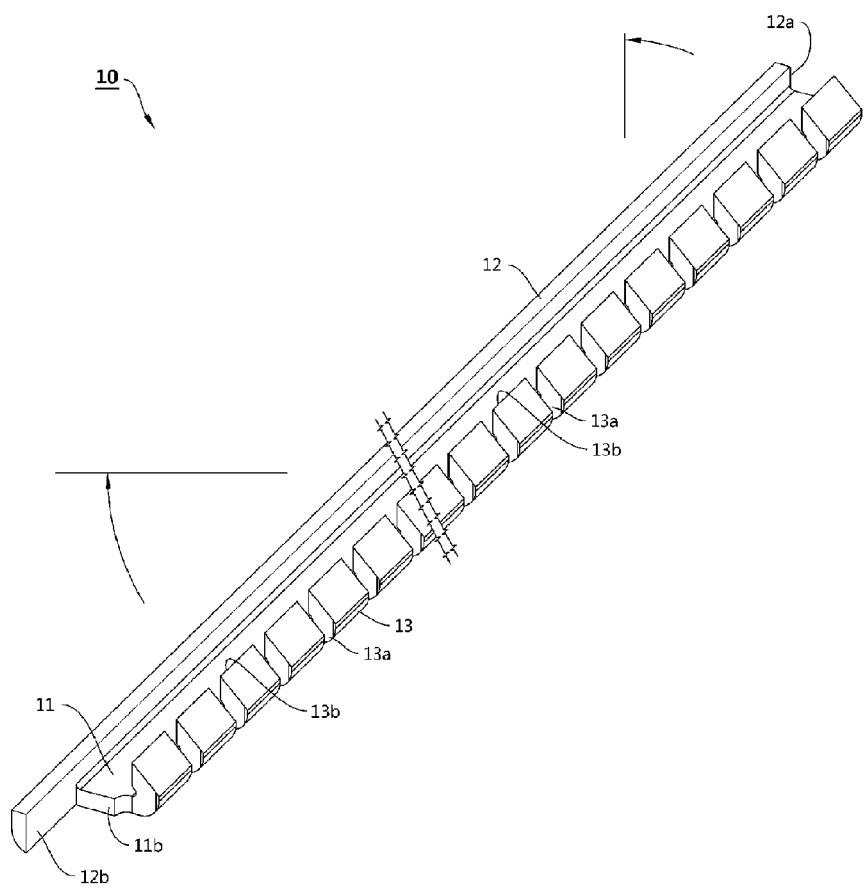

[Fig. 3]
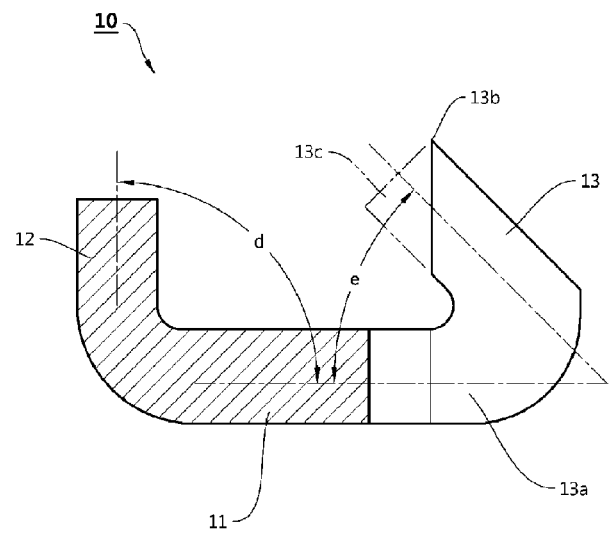
[Fig. 4]
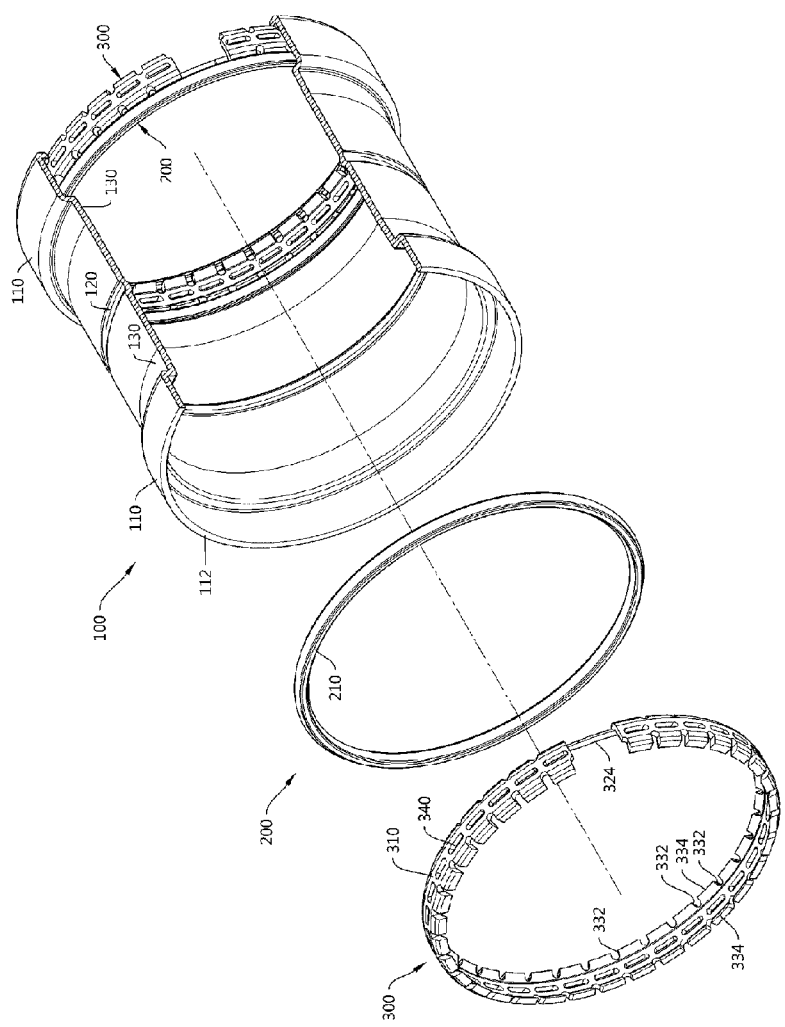

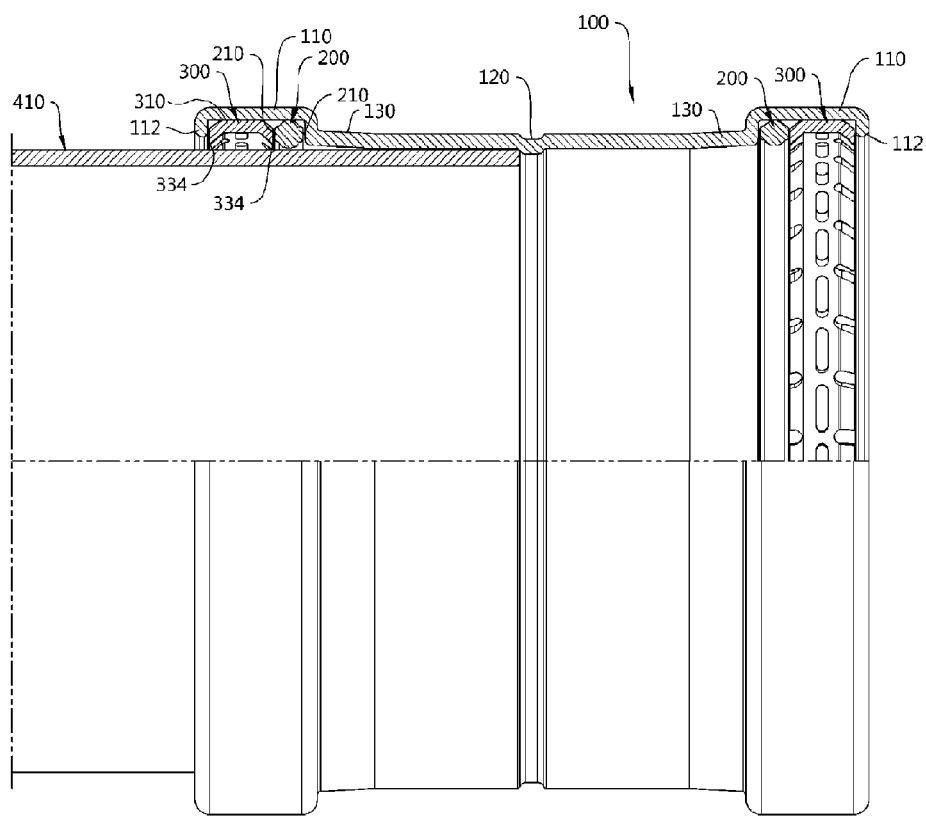
[Fig. 5]

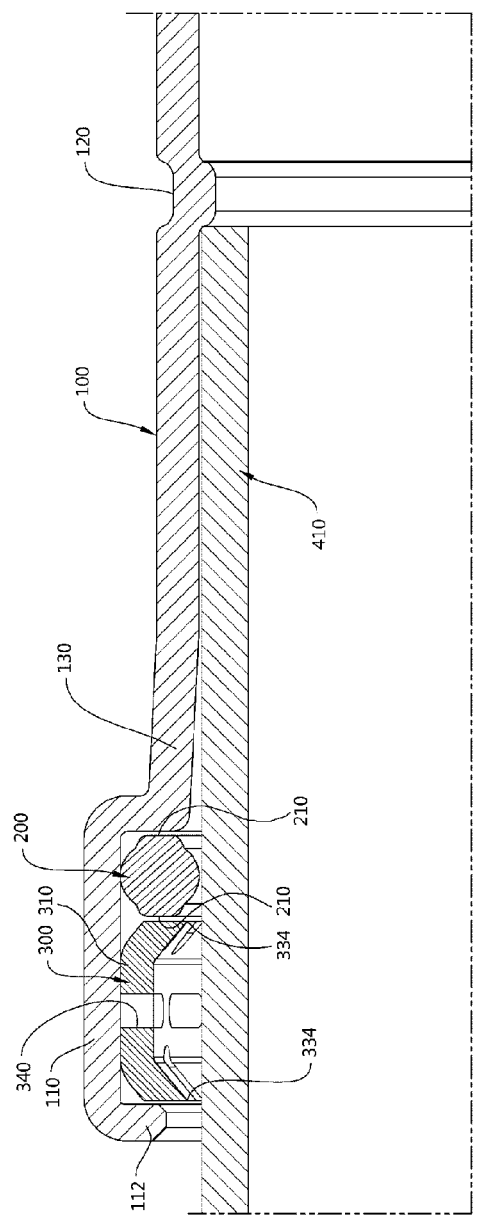
[Fig. 6]

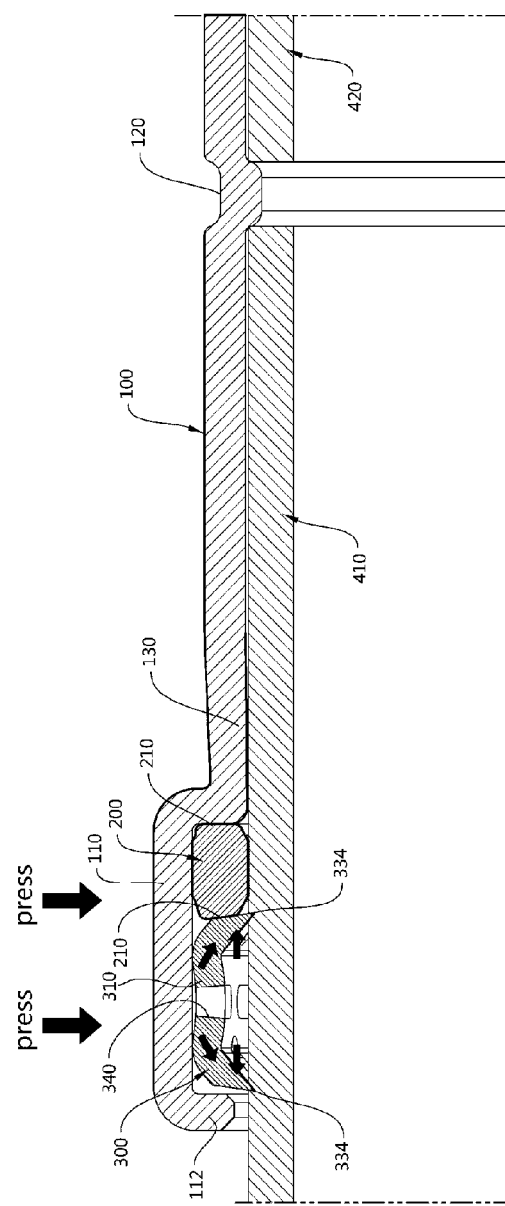
[Fig. 7]

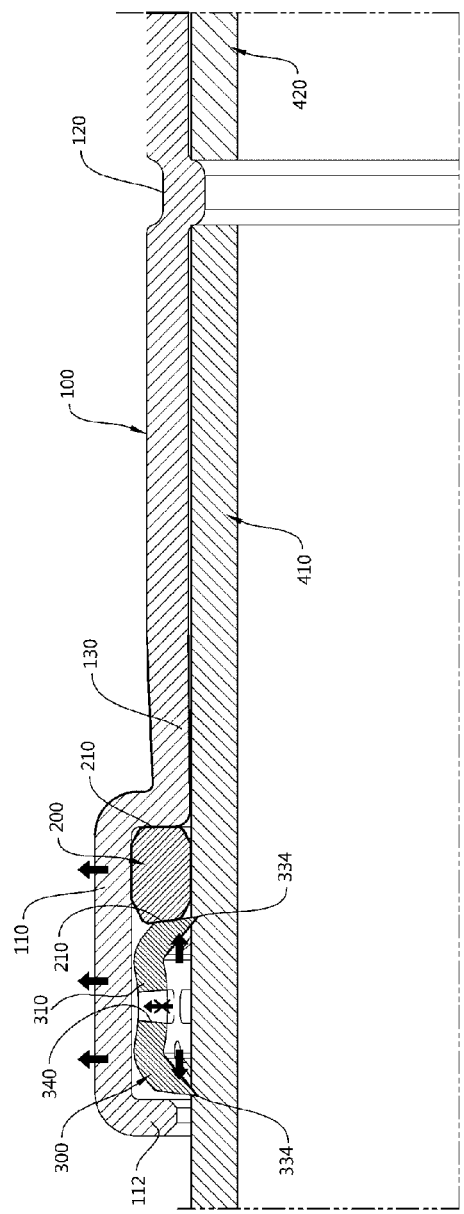
[Fig. 8]

[Fig. 9]
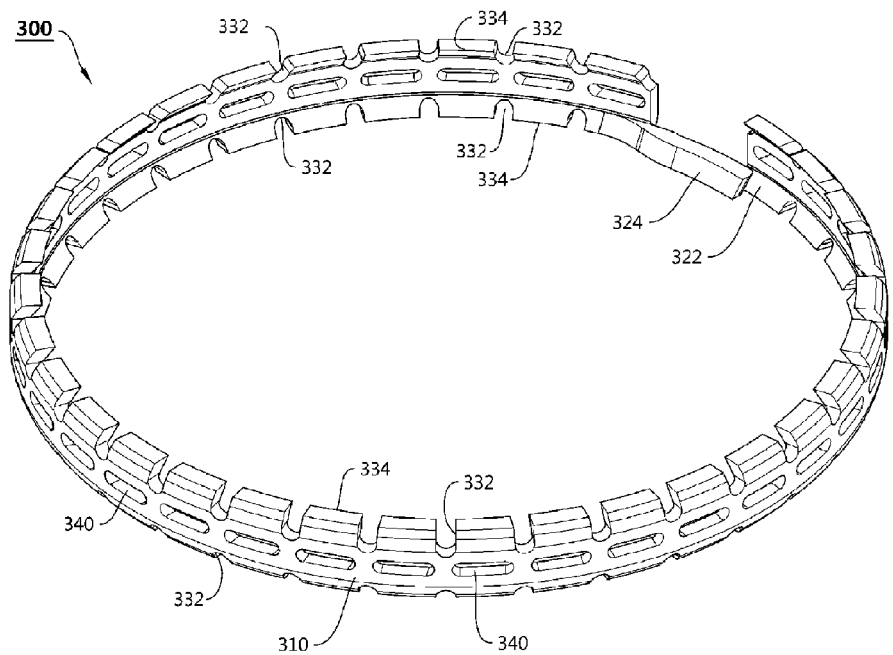
[Fig. 10]
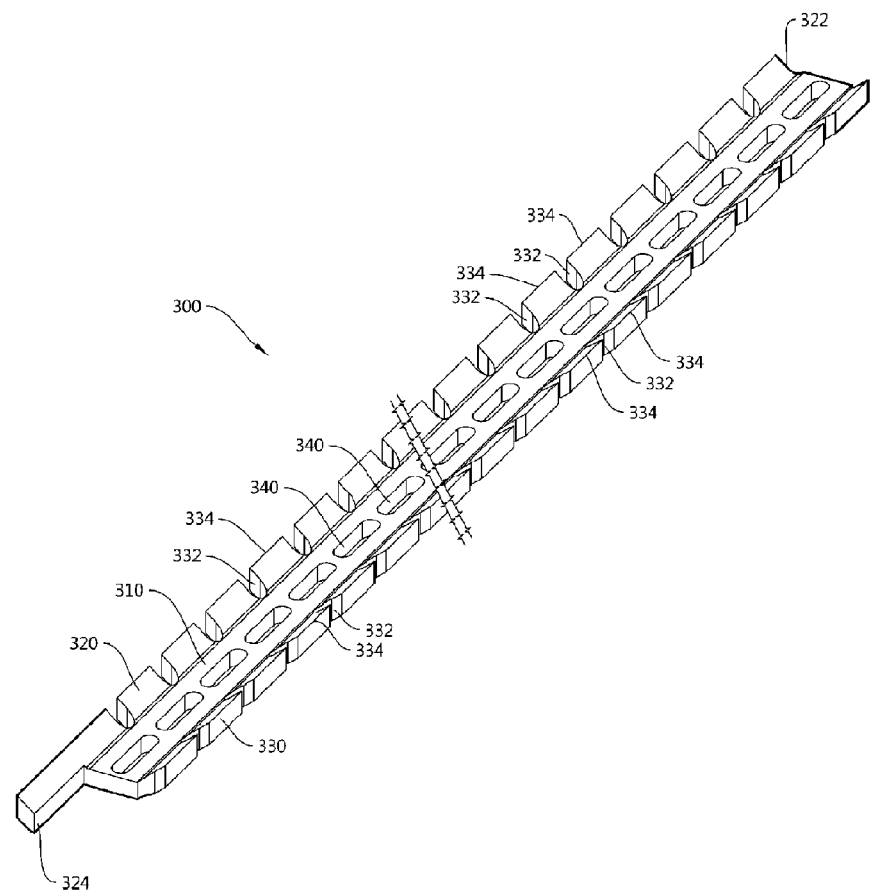

[Fig. 11]
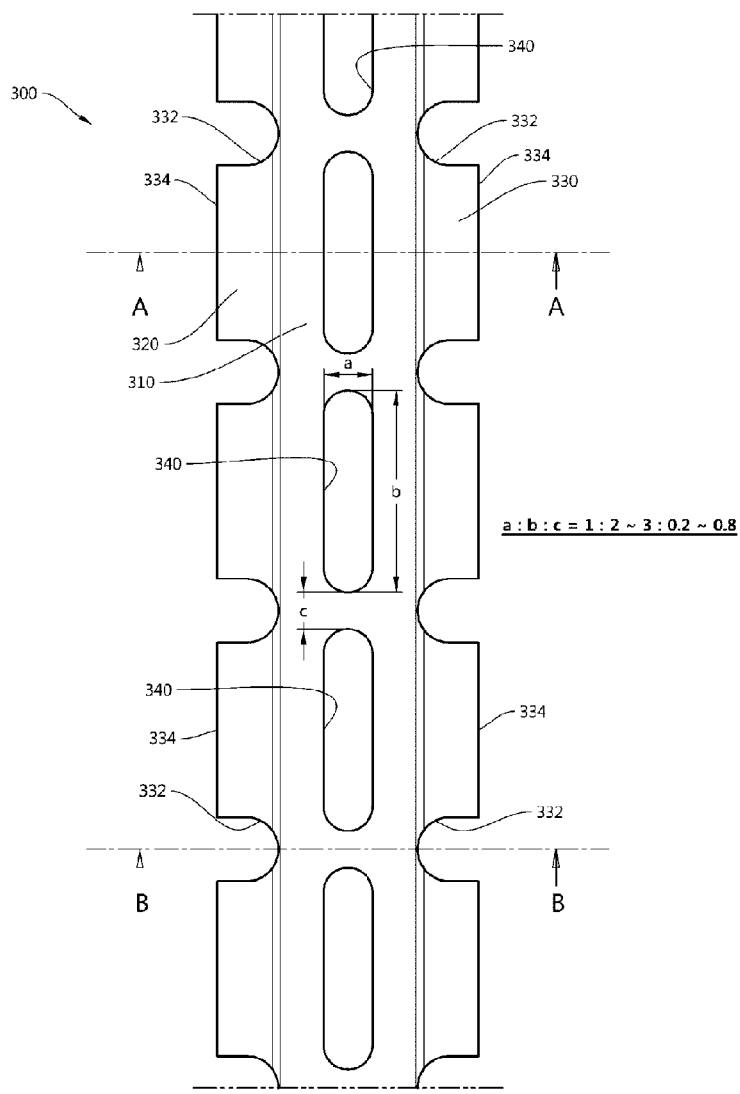
[Fig. 12]
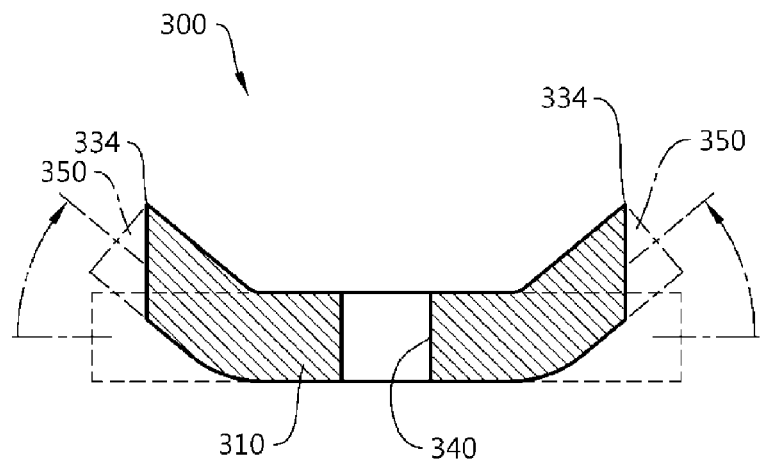

[Fig. 13]
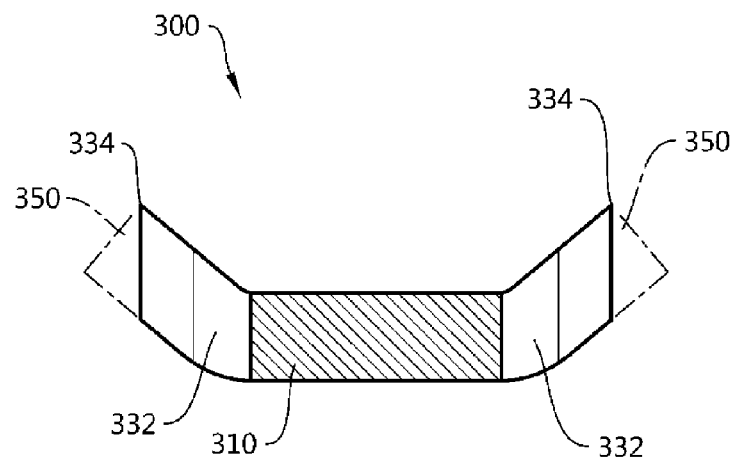
[Fig. 14]
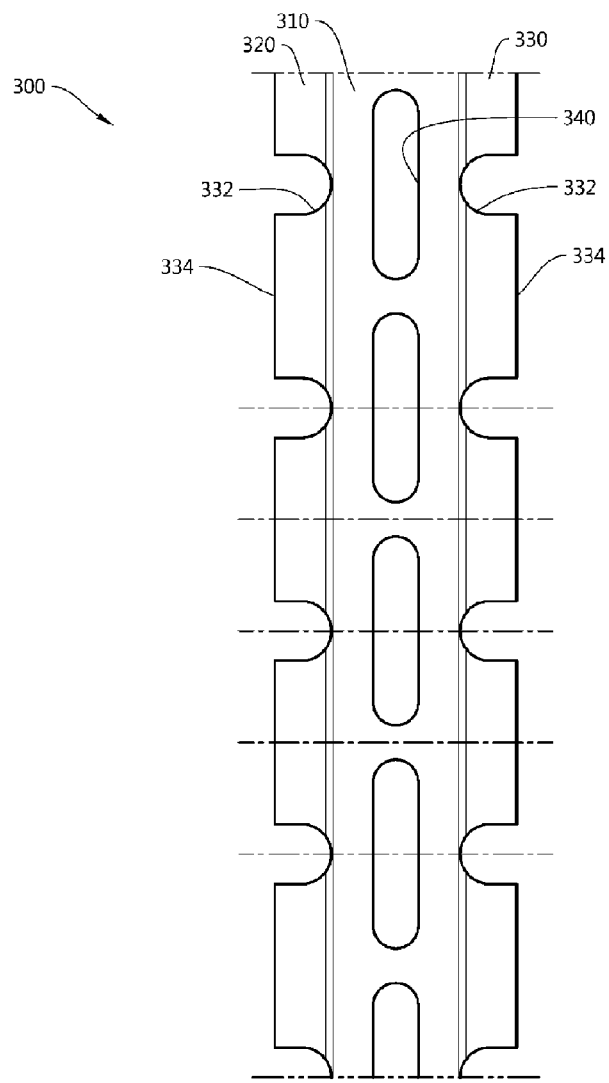

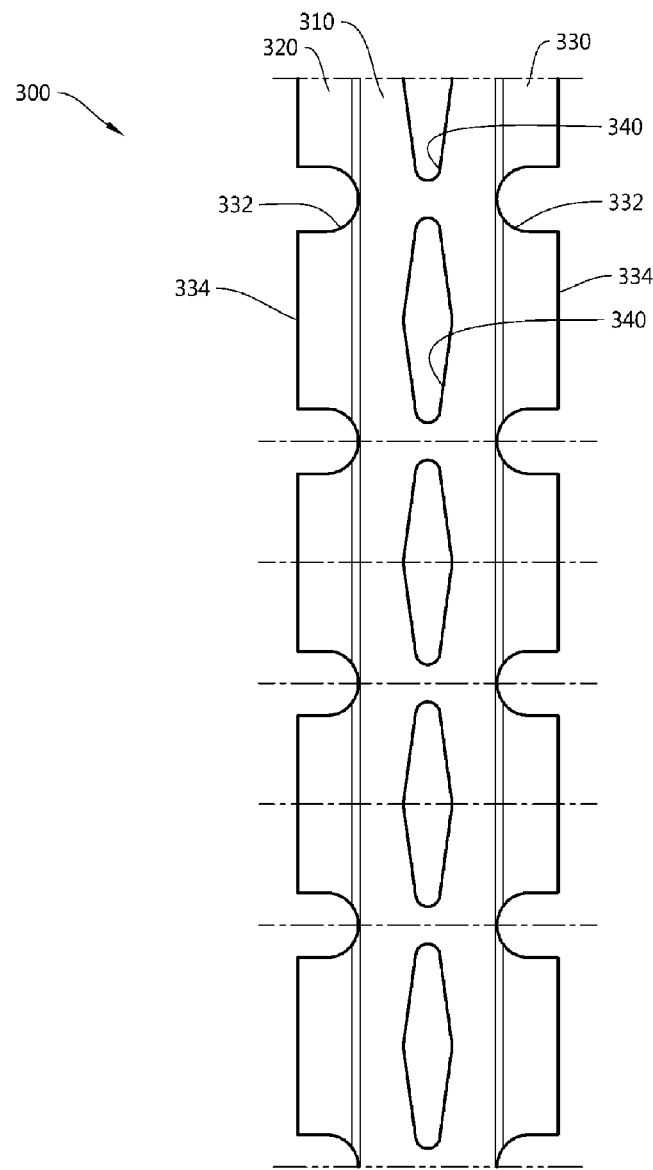
[Fig. 15]

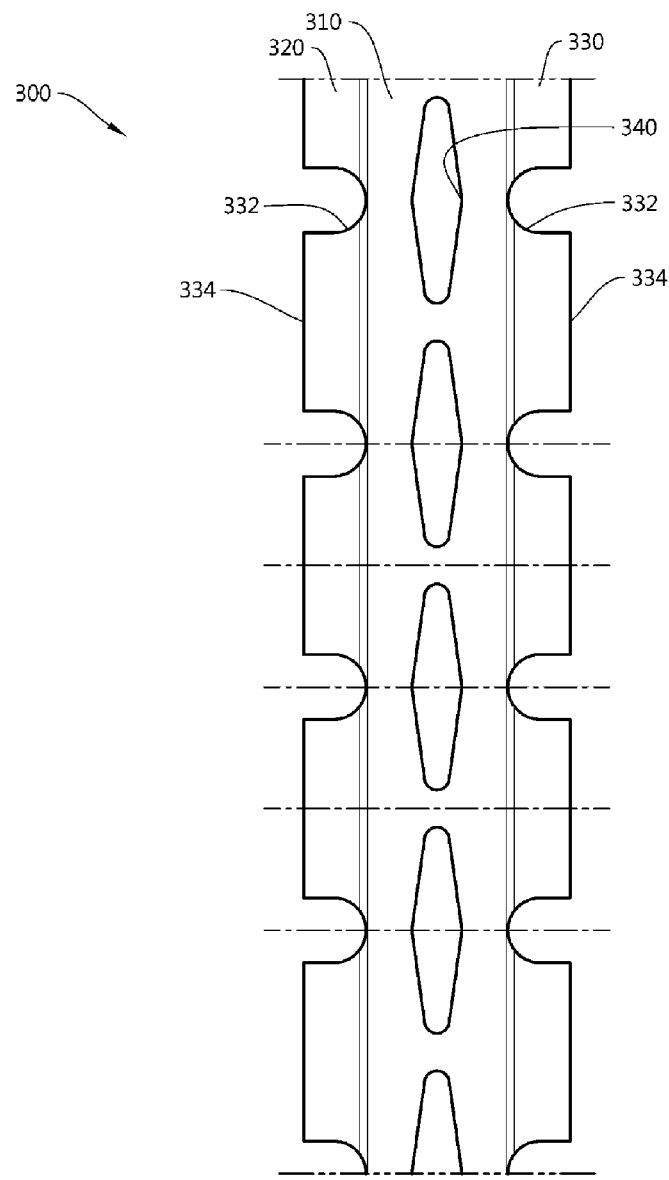
[Fig. 16]

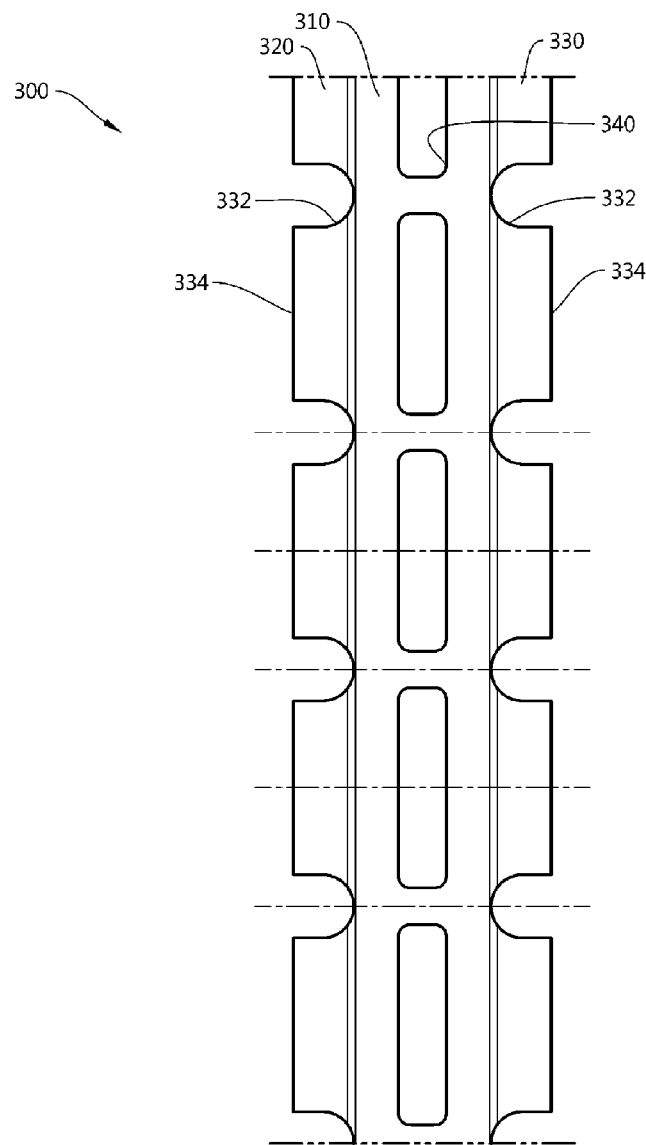
[Fig. 17]

[Fig. 18]
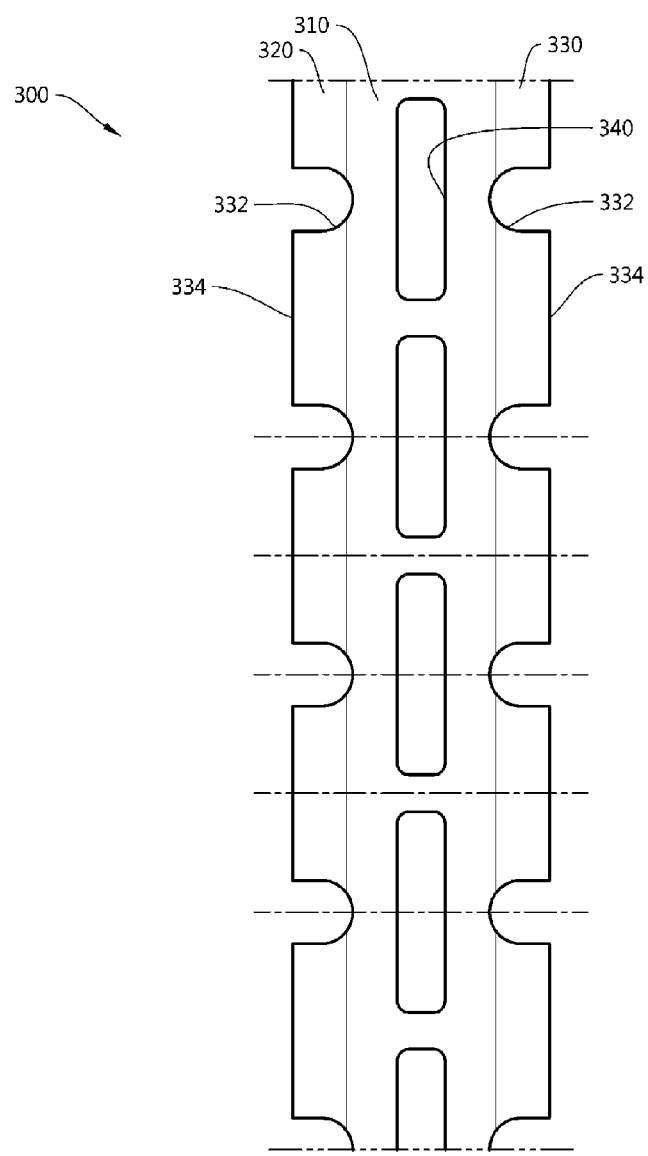

[Fig. 19]
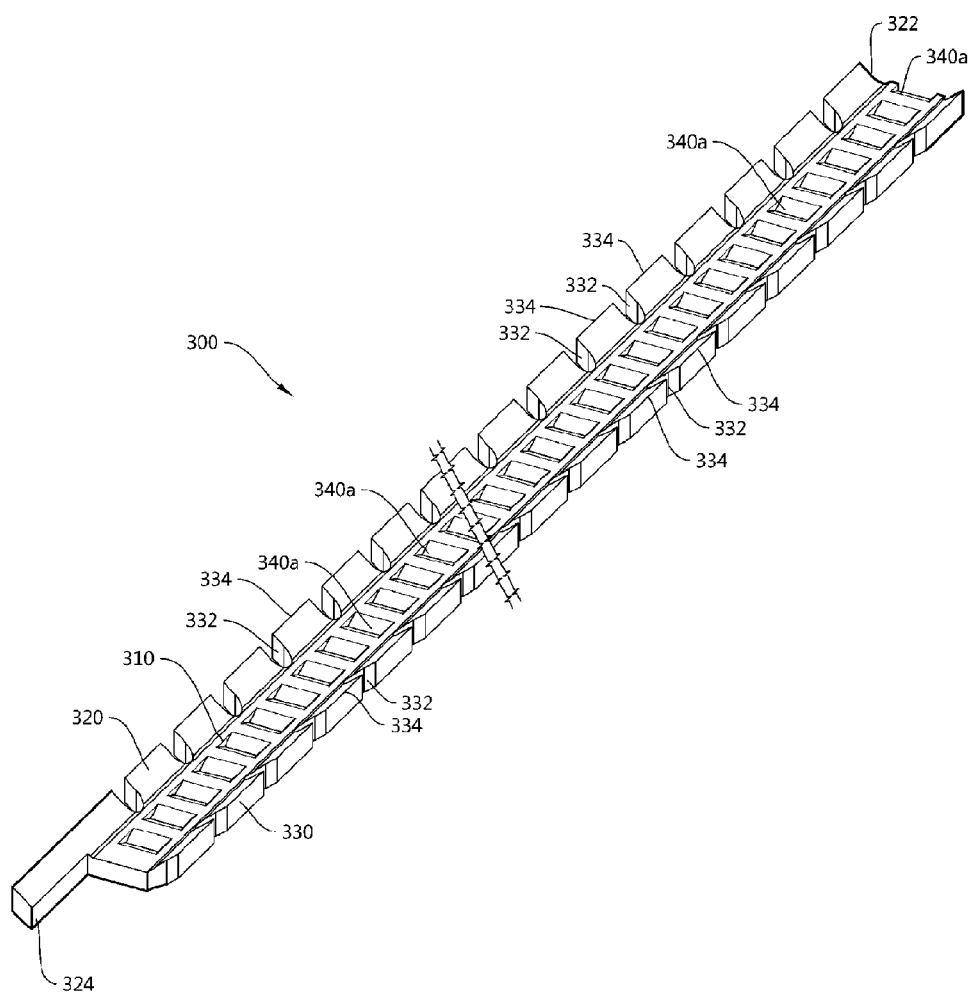

[Fig. 20]
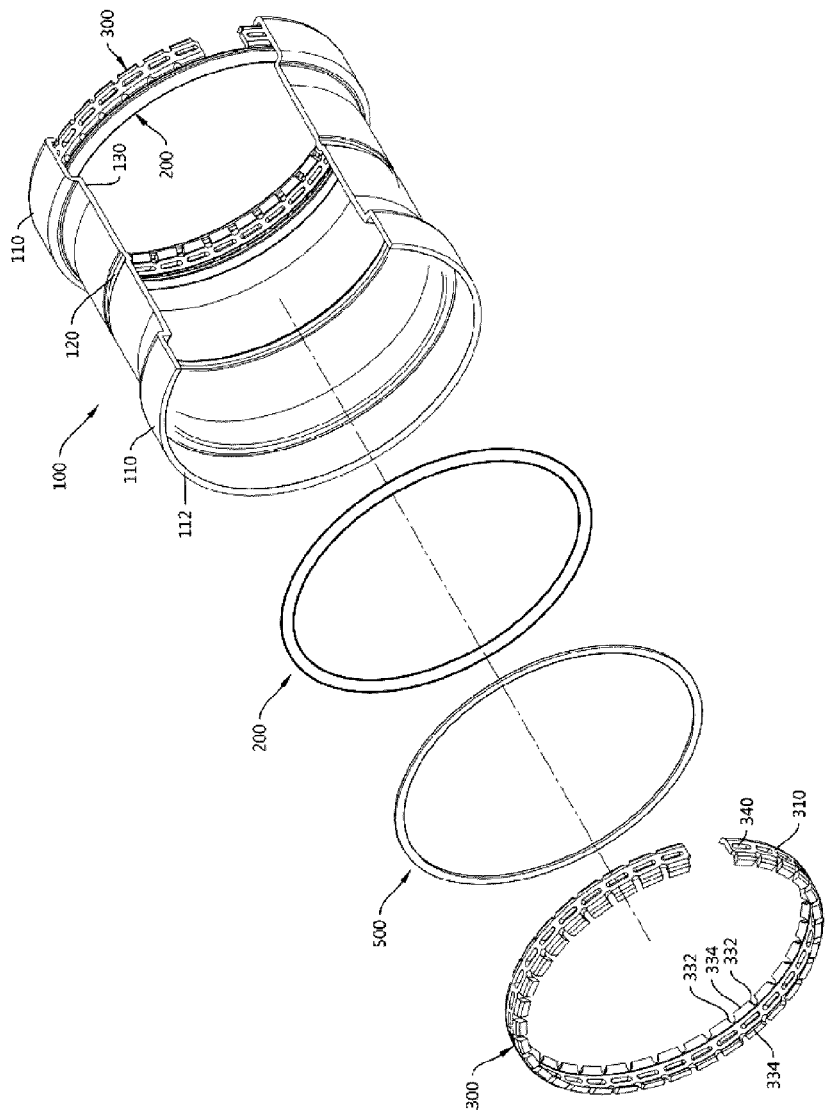
[Fig. 21]
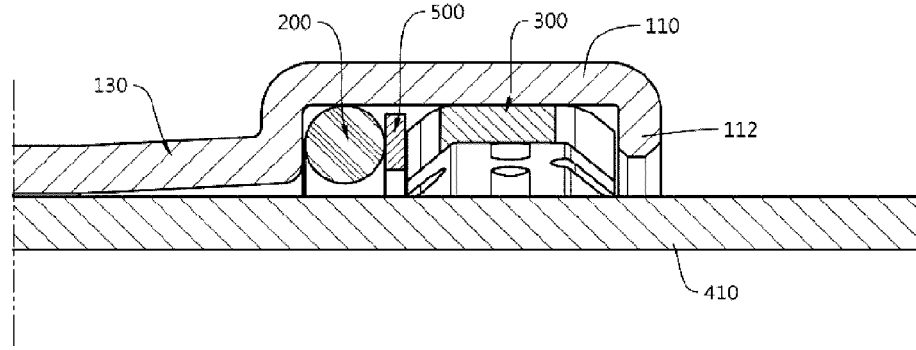

CONNECTOR ASSEMBLY FOR CONNECTING PIPES

CROSS-REFERENCE TO RELATED APPLICATION

This Application is a Section 371 National Stage Application of International Application No. PCT/KR2014/008036, filed on Aug. 28, 2014, the contents of which is hereby incorporated by reference in its entirety.

BACKGROUND OF THE INVENTION

Technical Field

The present invention relates to a connector assembly for connecting pipes. More particularly, it relates to a connector assembly for connecting pipes that further improves airtightness, by using a grip member having a pair of sharp portions.

Background Art

Generally, pipe connecting tools are used to connect various types of pipes that are constructed in the field of architecture and civil engineering.

Further, as a technique related to such a pipe connecting tool, there is Korean Patent Registration No. 10-1196158, published Nov. 1, 2012, hereinafter referred to as "Patent Document 1", which was filed and registered by the applicant of the present invention.

According to the description of Patent Document 1, a configuration is disclosed in which a large diameter portion is formed in an end portion of a connector socket, and an O-ring and a stopper grip ring are housed inside the large diameter portion.

An operation of Patent Document 1 is as follows. When a pipe for piping enters a connector socket, a stopper grip ring and an O-ring are disposed on an outer circumferential surface of the pipe. Thereafter, when an outer side of the large diameter portion is urged toward a central direction of the connector, the sharp portion of the stopper grip ring bites into the outer circumferential surface of the pipe to bind the pipe and the connector socket so as not to be separated from each other. Also, the O-ring is crimped to maintain airtightness between the pipe and the connector socket.

The above-described stopper grip ring 10 will be described in more detail with reference to accompanying FIGS. 1 to 3. Accompanying FIGS. 1 to 3 are a perspective views, an exploded view and a cross-sectional view for explaining the stopper grip ring in the conventional pipe connector.

After the material is provided in a linear shape as illustrated in FIG. 2, the stopper grip ring 10 is formed into a ring shape through a bending work process.

When examining the linear material, in the stopper grip ring 10, an O-ring support edge 12 and a stopper edge 13 are bent on both sides of an outer circumferential edge 11. The outer circumferential edge 11 is formed with both end portions 11a, 11b.

The O-ring support edge 12 is formed with an entry guiding edge 12a at one end portion and an insertion edge 12b at the other end portion. When the linear material is bent into a ring shape, the insertion edge 12b and entry guiding side 12a are superimposed with each other, and the O-ring support edge 12 forms a circle. The O-ring support edge 12 protects the O-ring when laying the pipe. The O-ring protection will be described in more detail. The stopper edge 13 and the O-ring are spaced apart from each other so as not to directly abut against each other, thereby preventing the O-ring from being distorted into a certain shape, and preventing the O-ring from being damaged by the stopper edge 13.

As illustrated in FIG. 3, the stopper edge 13 is bent so that an angle formed between the outer circumferential edge 11 and the stopper edge 13 becomes an acute angle. Meanwhile, the inner side of the stopper edge 13 is formed with an erased portion 13c by being ground, and thus, a sharp portion 13b is formed on the corner of the stopper edge 13. Also, the stopper edge 13 is formed with a slit 13a, and the sharp portion 13b is divided into a multiple sections by the slit 13a.

However, in the above-described conventionally known stopper grip ring 10, the following problems are pointed out.

The above-described stopper grip ring 10 is formed in a ring shape by bending a linear material. Since the O-ring support edge 12 is bent as illustrated in FIGS. 2 and 3, when bending the linear material, the O-ring support edge 12 becomes a cause of making the bending difficult. In particular, although the O-ring support edge 12 should be shaped round like a finished product of the stopper grip ring 10, there is a problem of being distorted or deformed in a certain form. That is, since the above-described stopper grip ring 10 is hard to bend the O-ring support edge 12, there is a problem of a decrease in productivity. Also, the above-described stopper grip ring 10 has a problem in which a lot defective products occur during production.

Moreover, the sharp portions 13b grinds the erased portion 13c in a state in which the stopper edge 13 is bent at an acute angle, and it is necessary to pay attention to prevent the grinding blade from interfering with the outer circumferential edge 11. That is, a careful attention should be paid to the stopper grip ring 10 in forming the sharp portion 13b, and thus, there is a problem of a decline on productivity.

Therefore, there is a need for a method for solving these problems.

DISCLOSURE

Technical Problem

The present invention has been made in consideration of the points described above, and an object thereof is to provide a connector assembly for connecting pipes that improves the fixing force using the grip member, and allows more effective indices.

Another object of the present invention is to provide a connector assembly for connecting pipes that can enhance the productivity of the grip member and improve the quality.

The objects of the present invention are not limited to the above-mentioned problems, and other problems which are not mentioned will be clearly understood by those skilled in the art from the following description.

Technical Solution

According to a first aspect of the present invention, there is provided a connector assembly for connecting pipes that includes: a connector formed with a hollow into which a pipe is inserted, a large diameter portion being included on at least one side of both end portions of the hollow, the large diameter portion being formed to have a relatively large inner diameter and having a housing space inside; a ring-shaped sealing member provided in the housing space; and a grip member provided adjacent to the sealing member in the housing space, wherein the grip member has a body portion formed to contact along an inner circumferential surface of the large diameter portion, and a pair of sharp portions that is formed in shapes corresponding to each other to be bent from both sides of the body portion, and is formed so as to partially bite into the outer circumferential surface of the pipe inserted into the hollow by crimping the outer circumferential surface of the large diameter portion, and under the condition of crimping the outer circumferential surface of the large diameter, bending strength of the body portion is set to be relatively lower than the sharp portions.

Further, a through-hole may be formed in the body portion.

Further, the through-hole may be formed to have a length greater than a width.

And, a depressed groove may be formed in the body portion.

Also, the body portion and the sharp portion may be formed of the same material, and density of the body portion may be formed to be lower than that of the sharp portion.

Further, the body portion may be formed in a shape that is curved downward.

Moreover, the body portion may be formed of a material having bending strength lower than the sharp portion.

Further, the sealing member may be formed with protrusions on the side surfaces.

Also, the body portion and the sharp portion may be formed to form an obtuse angle each other.

Then, the sharp portions may be dividedly formed by a plurality of slits.

In addition, the body portion may be formed with a plurality of through-holes, and centers of the through-holes may be formed so as to coincide with centers of the slits.

Moreover, the body portion may be formed with a plurality of through-holes, and the centers of the through-holes may be formed so as to coincide with a center point between the slits adjacent to each another.

Another aspect of the present invention, there is provided a connector assembly for connecting pipes that includes a connector formed with a hollow into which a pipe is inserted, a large diameter portion being formed on at least one side of both end portions of the hollow, the large diameter portion being formed to have a relatively large inner diameter and forming an housing space inside; a ring-shaped sealing member provided within the housing space; a grip member provided adjacent to the sealing member in the housing space; and a partition member provided between the sealing member and the grip member to space the sealing member and the grip member apart from each other, wherein the grip member has a body portion formed to contact along an inner circumferential surface of the large diameter portion, and a pair of sharp portions that is formed in shapes corresponding to each other to be bent from both sides of the body portion, and is formed so as to partially bite into the outer circumferential surface of the pipe inserted into the hollow by crimping the outer circumferential surface of the large diameter portion, and under the condition of crimping the outer circumferential surface of the large diameter, bending strength of the body portion is set to be relatively lower than the sharp portions.

Moreover, the partition member may be formed in a shape having a square cross-section.

Also, the partition member may be formed such that a surface abutting against the grip member is inclined.

Moreover, the height of the partition member may be formed to be lower than the height of the housing space.

Advantageous Effect

A connector assembly for connecting pipes of the present invention for solving the above-described problems has the following effects.

First, since a pair of sharp portions of the grip member is formed to correspond to each other, there is an advantage in that binding force between the pipe and the connector can be further improved, and it is possible to significantly improve the exponential effect of the sealing member.

Second, since the body portion of the grip member is formed to have relatively smaller bending strength than the sharp portion, there is an advantage in that the body portion is smoothly plastically deformed by crimping the large diameter portion, and the sharp portion stably bites into the outer circumferential surface of the pipe.

Third, there is an advantage in that, even when the pressure applied to the large diameter portion is removed, the spring back phenomenon does not occur.

Fourth, since the bending strength of the body portion can be adjusted in various ways, there is an advantage in that it is possible to produce various products.

The effects of the present invention are not limited to the above-mentioned effects, other effects that are not mentioned will be clearly understood to those skilled in the art from the scope of the claims.

BRIEF DESCRIPTION OF THE DRAWINGS

The above objects, other features and advantages of the present invention will become more apparent by describing the preferred embodiments thereof with reference to the accompanying drawings, in which:

FIGS. 1 to 3 are a perspective view, an exploded view, and a cross-sectional view for explaining a stopper grip ring in the conventional pipe connecting tool.

FIG. 4 is an exploded perspective view illustrating a structure of a connector assembly for connecting pipes according to a first embodiment of the present invention.

FIG. 5 is a cross-sectional view illustrating the structure of the connector assembly for connecting pipes according to the first embodiment of the present invention.

FIG. 6 is a cross-sectional view illustrating an appearance of the housing space in more detail, in the connector assembly for connecting pipes according to the first embodiment of the present invention.

FIG. 7 is a cross-sectional view illustrating an aspect in which permeates the sharp portion of the grip member bites into the pipe, by crimping the large diameter portion of the connector in the connector assembly for connecting pipes according to the first embodiment of the present invention.

FIG. 8 is a cross-sectional view illustrating a state in which pressure applied to the large diameter portion of the connector is released in the connector assembly for connecting pipes according to the first embodiment of the present invention.

FIG. 9 is a perspective view illustrating an appearance of the grip member in the connector assembly for connecting pipes according to the first embodiment of the present invention.

FIG. 10 is a perspective view illustrating a state in which the grip member is deployed in the connector assembly for connecting pipes according to the first embodiment of the present invention.

FIG. 11 is a plan view illustrating an exploded state of the grip member in the connector assembly for connecting pipes according to the first embodiment of the present invention.

FIG. 12 is a cross-sectional view taken from a line A-A of FIG. 11.

FIG. 13 is a cross-sectional view taken from a line B-B of FIG. 11.

FIG. 14 is a plan view illustrating a first modified example of the grip member in the connector assembly for connecting pipes according to the first embodiment of the present invention.

FIG. 15 is a plan view illustrating a second modified example of the grip member in the connector assembly for connecting pipes according to the first embodiment of the present invention.

FIG. 16 is a plan view illustrating a third modified example of the grip member in the connector assembly for connecting pipes according to the first embodiment of the present invention.

FIG. 17 is a plan view illustrating a fourth modified example of the grip member in the connector assembly for connecting pipes according to the first embodiment of the present invention.

FIG. 18 is a plan view illustrating a fifth modified example of the grip member in the connector assembly for connecting pipes according to the first embodiment of the present invention.

FIG. 19 is a perspective view illustrating a sixth modified example of the grip member in the connector assembly for connecting pipes according to the first embodiment of the present invention.

FIG. 20 is an exploded perspective view illustrating a structure of a connector assembly for connecting pipes according to a second embodiment of the present invention.

FIG. 21 is a cross-sectional view illustrating an appearance of the housing space in more detail, in the connector assembly for connecting pipes according to the second embodiment of the present invention.

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter. Other objects, features, and advantages will be apparent through the detailed description of the embodiments with reference to the accompanying drawings.

Hereinafter, preferred embodiments of the present invention in which the object of the present invention can be concretely realized will be described with reference to the accompanying drawings. In describing the present embodiment, the same names and the same reference numerals are used in the same configuration, and additional description thereof will not be provided.

FIG. 4 is an exploded perspective view illustrating a structure of a connector assembly for connecting pipes according to a first embodiment of the present invention, FIG. 5 is a cross-sectional view illustrating the structure of the connector assembly for connecting pipes according to the first embodiment of the present invention.

Moreover, FIG. 6 is a cross-sectional view illustrating an appearance of the housing space in more detail, in the connector assembly for connecting pipes according to the first embodiment of the present invention.

As illustrated in FIGS. 4 to 6, the connector assembly for connecting pipes of the invention includes a connector 100, a sealing member 200 and a grip member 300.

The connector 100 is formed with a hollow into which a pipe 410 is inserted, and on at least one side of both end portions of the hollow, a large diameter portion 110, which is formed to have a relatively large inner diameter and forms a housing space inside, is included.

In the case of this embodiment, the large diameter portion 110 is formed at both ends of the connector 100, and the sealing member 200 and the grip member 300 are provided in the housing space formed inside the large diameter portion 110. However, unlike this embodiment, it is a matter of course that the large diameter portion 110 may be formed only in either one end portion of the connector 100.

Moreover, in this embodiment, a tip of the large diameter portion 110 is bent to form a bent end portion 112, and the bent end portion 112 prevents the sealing member 200 and the grip member in the housing space 300 from escaping to the outside.

Further, in the intermediate portion of the connector 100, a stopper portion 120 protruding in an inner diameter direction is formed. The stopper portion 120 that causes the end portion of the pipe 410 to touch, thereby limiting a maximum insertion position of the pipe 410, when the pipe 410 is fixed to the connector 100.

Moreover, between the large diameter portion 110 and the stopper portion 120, a tapered portion 130 is formed such that the diameter gradually decreases from the large diameter portion 110 in the direction of the stopper portion 120. The tapered portion 130 plays the role of allowing the pipe 410 to more easily enter the connector 100. That is, since the pipe 410 first abuts against a larger diameter portion of the entire length of the connector 100, it can be smoothly inserted into the hollow of the connector 100.

Meanwhile, a lower part of the tapered portion 130 adjacent to the large diameter portion 110 has a margin. Thus, when the large diameter portion 110 is crimped by the tapered portion 130, the connector 100 can be subjected to the smooth shrinkage deformation without being distorted into an arbitrary shape.

The sealing member 200 is a component provided in the housing space, and is formed in a ring shape. Moreover, the grip member 300 is a component provided adjacent to the sealing member 200 in the housing space. These components will be described in more detail below.

FIG. 6 is a cross-sectional view illustrating an appearance in the housing space in more detail, in the connector assembly for connecting pipes according to the first embodiment of the present invention. FIG. 7 is a cross-sectional view illustrating a state in which a sharp portion 334 of the grip member 300 bites into the pipe 410 by crimping the large diameter portion 110 of the connector 100, in the connector assembly for connecting pipes according to the first embodiment of the present invention.

Moreover, FIG. 8 is a cross-sectional view illustrating a state in which pressure applied to the large diameter portion 110 of the connector 100 is released, in the connector assembly for connecting pipes according to the first embodiment of the present invention.

As illustrated in FIGS. 6 to 8, the sealing member 200 and the grip member 300 are provided the housing space of the connector 100.

The sealing member 200 closely contacts the large diameter portion 110 and the pipe 410 as illustrated in FIG. 7 to maintain airtightness, when the large diameter portion 110 is crimped.

In this embodiment, protrusions 210 are formed on the side surfaces of the sealing member 200, and the operation of the protrusions 210 is as follows. The sealing member 200 is provided as a soft material, but a phenomenon in which the sealing member is tightly hardened with a lapse of time may occur. When the protrusions 210 are not present in the sealing member 200 in a situation where the sealing member 200 is hardened, the side surfaces of the sealing member 200 may be formed with a pushed mark so as to correspond to the side surfaces of the grip member 300.

While the sealing member 200 maintains the soft material characteristics, there is no problem in maintenance of airtightness. However, when the sealing member 200 is hardened, the mark pushed by the grip member 300 may case an adverse effect on the maintenance of airtightness.

Therefore, the sealing member 200 according to this embodiment is formed with protrusions 210 on the side surfaces to prevent the sealing member 200 body from being deformed from the grip member 300, thereby being able to continue the airtightness action. That is, in this embodiment, the sealing member 200 can further improve the airtightness performance by the protrusions 210 of the side surfaces.

Meanwhile, the protrusions 210 can be formed on both sides of the sealing member 200, and in this case, it is possible to significantly improve the productivity, by allowing the sealing member to be inserted without considering directionality when assembled by inserting the sealing member 200 into the large diameter portion 110.

In other words, an operator does not need to check that the protrusion 210 is formed on which side surface of the sealing member 200 when assembling the sealing member 200 to the connector 100, and thus, it is possible to produce a greater number of connector assemblies for connecting pipes per unit hour.

The grip member 300 includes a body portion 310 and a pair of sharp portions 334. Specifically, the body portion 310 is formed so as to abut against along the inner circumferential surface of the large diameter portion 110. Moreover, the pair of sharp portions 334 is formed in shapes corresponding to each other, bent from both sides of the body portion 310, respectively, and is formed so as partially bite into the outer circumferential surface of the pipe 410 inserted into the hollow, by crimping the outer circumferential surface of the large diameter portion 110.

That is, when pressure acts from the outside of the large diameter portion 110 as in FIG. 7, the body portion 310 of the grip member 300 is bent, and the pair of sharp portions 334 bites into the outer circumferential surface of the pipe 410. Thus, the grip member 300 can prevent the pipe 410 from being disengaged from the connector 100.

Meanwhile, in order to perform this operation, bending strength of the body portion 310 of the grip member 300 is formed to be relatively lower than the sharp portions 334 under the condition of crimping the outer circumferential surface of the large diameter portion 110.

That is, when crimping the outer circumferential surface of the large diameter portion 110, the body portion 310 is first deformed, and thus, the pair of sharp portions 334 spreads to both sides and bites into the inside of the pipe 410. Therefore, it is possible to obtain a state of being stably fixed to the pipe 410, and even when the pressure applied to the large diameter portion 110 is removed as in FIG. 8, a spring back phenomenon does not occur, and it is possible to maintain the binding states.

Meanwhile, in such a grip member 300, setting the bending strength of the body portion 310 to be smaller than the sharp portion 334 can be implemented by various methods.

For example, the body portion 310 will be able to have a shape in which a through-hole 340 or a recessed groove is formed. In such a case, it is obvious that bending strength of the body portion 310 becomes smaller than that of the sharp portion 334. In the case of this embodiment, a plurality of through-holes 340 was assumed to be formed along the body portion 310.

Moreover, in another method, the body portion 310 and the sharp portion 334 are formed of the same material, and at this time, by forming the density of the body portion 310 to be lower than the density of the sharp portion 334, it will also be possible to form the small bending strength.

Also, even when the body portion 310 is formed in a shape that is curved downward from the beginning, it is possible to obtain such an effect.

Otherwise, even when the body portion 310 is formed of a material having the bending strength lower than the sharp portion 334, it is possible to obtain the same effect.

Thus, setting the bending strength of the body portion 310 to be smaller than the sharp portion 334 may be implemented by various methods. It is a matter of course that other methods that are not specified can be used in addition to the exemplified each method.

Hereinafter, the binding force of the connector assembly for connecting pipes according to the present embodiment will be described in more detail.

As illustrated in FIG. 7, when the external pressure acts on the large diameter portion 110, the grip member 300 and the sealing member 200 are deformed under pressure. The sealing member 200 closely contacts the inner circumferential surface of the large diameter portion 110 and the pipes 410, 420 to maintain airtightness, while being crimped.

Moreover, the grip member 300 bites into the outer circumferential surface of the pipe 410 in such a manner that the pair of sharp portions 334 spreads to both sides by the pressure applied from the outside of the large diameter portion 110. In particular, since the sharp portions 334 have a shape having an obtuse angle in an outward direction, each of the sharp portions 334 more smoothly spread to both sides. That is, since the pair of sharp portions 334 bites into the pipe 410, while spreading in opposite directions, the binding force can be further improved.

Meanwhile, in this embodiment, bending strength of the body portion 310 of the grip member 300 is lowered by the through-hole 340 to cause a plastic deformation. That is, even if an external force exerted on the large diameter portion 110 is removed, the deformed state of the grip member 300 can be maintained as illustrated in FIG. 8, and the spring-back phenomenon hardly occurs.

Thus, even if the pressure of the large diameter portion 110 is removed, the sharp portion 334 can keep the state of biting into the surface of the pipes 410, 420, and thus, the connector assembly for connecting pipes according to the embodiment can stably maintain the binding force between the grip member 300 and the pipes 410, 420.

The detailed matters of the grip member 300 will be described in more detail below.

FIG. 9 is a perspective view illustrating an appearance of the grip member 300 in the connector assembly for connecting pipes according to the first embodiment of the present invention, and FIG. 10 is a perspective view illustrating a deployed state of the grip member 300 in the connector assembly for connecting pipes according to the first embodiment of the present invention.

As described above, the sharp portions 334 are formed by bending on both sides of the body portion 310 of the grip member 300. At this time, an insertion portion 324 is formed to be extended from the one end of the grip member 300, and entry portion entrance portion 322 for guiding the entry of the insertion portion 324 is formed at the other end.

That is, in a process of the grip member 300 being molded into a ring form as illustrated in FIG. 9 from a linear material illustrated in FIG. 10, the insertion portion 324 is guided by the entry portion 322 to form a ring shape as a whole.

Further, in this embodiment, the sharp portions 334 are dividedly formed by a plurality of slits 332. Such slits 332 may improve the workability and reduce the weight of the grip member 300, when bending the linear material of the grip member 300 into a ring shape.

As described in the background art, there is a problem in that, when the O-ring support edge in a conventional stopper grip ring is molded into a ring shape from a linear shape, since it is not easily molded and is irregularly bent into a certain shape, a defective product is produced or a lot of time is taken in production to lower productivity.

In contrast, since the grip member 300 according to this embodiment may be bent in the formed part of the slit 332, it is possible to more quickly perform the bending work, and it is possible to produce a high-quality product.

Meanwhile, in this embodiment, through-holes 340 are formed in the body portion 310. The through-holes 340 enables the bending strength of the body portion 310 to be formed smaller than that of the sharp portion 334, as described above. Further, like the slits 332, the through-holes 340 can improve the workability and reduce the weight, when bending the linear material of the grip member 300 into a ring shape.

FIG. 11 is a plan view illustrating an exploded state of the enlarged grip member 300 in the connector assembly for connecting pipes according to the first embodiment of the present invention.

Moreover, FIG. 12 is a cross-sectional view illustrating an A-A section of FIG. 11, and FIG. 13 is a cross-sectional view illustrating a B-B section of FIG. 11.

As illustrated in FIGS. 12 and 13, a pair of sharp portion 334 is bent to form an obtuse angle in a state of forming a straight line together with the body portion 310. Thereafter, outer corners 350 of the sharp portions 334 are erased by grinding. Thus, the grip member 300 according to the present embodiment can improve the productivity compared to conventional products, by grinding the outer parts of the sharp portions 334.

Furthermore, since the sharp portions 334 form an obtuse angle with respect to the body portion 310 in the grip member 300, when the pair of sharp portions 334 bites into the outer circumferential surface of the pipe, force in which the respective sharp portions 334 spread each other is generated. The force can further improve the binding force between the pipe and the grip member 300.

Meanwhile, as illustrated in FIG. 11, the through-hole 340 may have a long hole shape in which a length b is greater than a width a. By doing so, it is possible to relatively lower the widthwise rigidity of the material the grip member 300 compared to the lengthwise rigidity of the material, on the basis of the case of the linear material. That is, when forming the linear material into a circular shape, the material can be more easily and quickly molded.

Moreover, the through-hole 340 can be configured so that a ratio of the width a and the length b is 1:2 to 3. The reason is that, if the length b of the through-hole 340 is too small, effects as the long hole is reduced by half, and if the length b is too large, there is a risk of excessive reduction in rigidity of the grip member 300.

Thus, when the length b of the through-hole 340 is more than twice the width a, it is possible to expect good workability during molding, and the good rigidity can be kept when the length is less than three times the width.

Further, a gap c is formed between the through-hole 340 and another adjacent through-hole 340, and the ratio of the width a to the gap c can be 1:0.2 to 0.8. The reason is that there is a risk of decrease in rigidity of the grip member 300 if the gap c is too small, and there is a risk of decrease in workability during molding of the grip member 300 when the gap c is too large.

In this embodiment, if the gap c is provided at a ratio of more than 0.2 based on the width a of the through-hole of 1, the good rigidity of the grip member 300 can be kept, and if the gap is provided at a ratio of less than 0.8, it is possible to keep the good workability during bending.

However, this is a one embodiment, the present invention is not limited thereto, and standards and shapes of the through-holes 340 can be implemented by being variously modified.

FIGS. 14 to 19 show modified examples of the grip member 300, respectively.

As illustrated in FIGS. 14 to 19, the through-holes 340 may have any one shape of a rectangular shape, an elliptical shape or a diamond shape. In addition, any two or more of a rectangular shape, an elliptical shape and a diamond shape are formed in the through-holes 340 in a complex manner.

When the through-holes 340 are formed in a rectangular shape, it is possible to maximize the porosity in preparation for the processing of the through-holes 340. In more detail, in the case of the rectangular shape, it is possible to maximize the space occupied by the through-holes 340 in the surface area of the same body portion 310, which can significantly contribute to a weight reduction of the grip member 300.

Further, when the through-holes 340 are formed into an elliptical shape, since an inflection point in the through-holes 340 is minimized, it is possible to alleviate concentration of stress on any particular part when the grip member 300 is bent into a circular shape. This can prevent the rigidity of the grip member 300 from abnormally decreasing.

Meanwhile, the diamond-shaped through-hole 340 can expect a complex action that allows the prevention of a decrease in rigidity, while increasing the porosity. That is, since the space of the intermediate portion of the diamond-shaped through-hole 340 is wide, the cross-sectional area of the grip member 300 becomes relatively smaller in the intermediate portion, and the deformation becomes relatively easier to enhance workability, and since the cross-sectional area of the grip member 300 becomes relatively larger in the portion of the vertex, the rigidity does not decrease.

Furthermore, meanwhile, as illustrated in FIGS. 14, 16 and 18, the center of the through-hole 340 may be formed to coincide with the center of the slit 332.

In this case, since the widthwise cross-sectional area of the grip member 300 can be minimized by the slit 332 and the through-hole 340 in the portion in which the center of the through-hole 340 is located, it is possible to relatively reduce the rigidity as compared to other portions. Thus, when performing the bending work of the linear material into a ring shape, since the portion of low rigidity is more easily deformed, the workability is improved.

Especially, since the member is bent at the portion in which the slits 332 are formed and the respective slits 332 are formed at regular intervals, when the grip member 300 is molded in a ring shape, it can be molded such that overall appearance is close to a perfect circle shape.

Meanwhile, as illustrated in FIGS. 11, 15 and 17, the center of the through-hole 340 can be formed so as to coincide with the center point between the slits 332 adjacent to each other.

In this case, since the widthwise cross-sectional area of the grip member 300 is secured in the portion in which the center of the through-hole 340 is located, it will be able to maintain rigidity.

Also, the end portions of each slit 332 and the through-hole 340 can positioned adjacent to each other in a diagonal direction. That is, since it is possible to minimize the cross-sectional area of a portion in which the slit 332 and the through-hole 340 are connected to each other, it is possible to relatively lower rigidity compared to other portions. Thus, when performing the bending work of the linear material into a ring shape, since a portion of low rigidity will be more easily deformed, the workability is improved.

Especially, since the member is bent in a portion of a shortest distance connecting the slit 332 and the through-hole 340, and the slits 332 are so formed at regular intervals, when the grip member 300 is molded in a ring shape, the overall outer shape of the grip member 300 can be molded closer to a perfect circle.

If the overall outer shape of the grip member 300 is formed close to a perfect circle, there is an advantage of easily inserting the grip member 300 into the connector 100. The reason is that, if roundness of the grip member 300 is poor, interference with the large diameter portion 110 of the connector 100 occurs, and a problem of being unable to easily assemble may occur.

Meanwhile, as illustrated in FIG. 19, the through-holes may be replaced with depressed grooves 340a. A plurality of the recessed grooves 340a can be continuously formed at regular intervals, and is concavely formed. Since such depressed grooves 340a are formed on the surface of the body portion 310, it is possible to allow bending to be more easily and smoothly performed when the linear material is bent into a ring shape.

Although the first embodiment of the present invention has been described above, a second embodiment of the present invention will be described below.

FIG. 20 is an exploded perspective view illustrating a structure of a connector assembly for connecting pipes according to a second embodiment of the present invention, and FIG. 21 is a cross-sectional view illustrating an appearance in housing space in more detail, in the second connector assembly for connecting pipes according to the embodiment of the present invention.

In the case of the second embodiment of the present invention illustrated in FIGS. 20 and 21, although all the components are formed in the same manner as in the first embodiment described above, the difference is that the second embodiment further includes a partition member 500 provided between the sealing member 200 and the member 300 to space the sealing member 200 and the grip member 300 apart from each other.

The partition member 500 spaces the sealing member 200 and the grip member 300 apart from each other in the state of being partitioned from each other to prevent the sealing member 200 from being worn or damaged by the grip member 300, thereby being capable of improving the durability of the device.

In particular, in the present embodiment, the partition member 500 is formed in a rectangular cross-section, and in such a case, due to the simple shape, it is conveniently manufactured and it is possible to reduce manufacturing costs.

Further, the partition member 500 may be formed so that a surface abutting against the grip member 300 is inclined. This is in order to have a shape corresponding to the deformation of the sharp portion when the grip member 300 is deformed by crimping.

Meanwhile, the height of the partition member 500 may be formed lower than the height of the connector housing space. The reason is to prevent an occurrence of friction between the upper and lower ends of the partition member 500 and the inner surfaces of the connector and the pipe, when the partition member 500 is expelled in a lateral direction in accordance with the deformation of the grip member 300.

INDUSTRIAL APPLICABILITY

Although the preferred embodiments of the present invention have been described as described above, it will be apparent to those having ordinary skill in the art that the present invention can be embodied in other specific forms without departing from its spirit or category, in addition to the embodiments described above. Therefore, the above-mentioned embodiments should be considered as being illustrative rather than being limited, and accordingly, the present invention can also be varied within the category of the appended claims and its equivalence, without being limited to the above description.

What is claimed is:

1. A connector assembly for connecting pipes comprising:
   a connector formed with a hollow into which a pipe is inserted, a large diameter portion being included on at least one side of both end portions of the hollow, the large diameter portion being formed to have a relatively large inner diameter and having a housing space inside;
   a ring-shaped sealing member provided in the housing space; and
   a grip member provided adjacent to the sealing member in the housing space, the grip member comprising:
      a body portion formed to contact along an inner circumferential surface of the large diameter portion, wherein under the condition of crimping the outer circumferential surface of the large diameter, the body portion is bendingly deformed toward a central direction of the pipe; and
      a pair of sharp portions that is formed in shapes corresponding to each other to be bent from both sides of the body portion, and is formed so as to partially bite into the outer circumferential surface of the pipe inserted into the hollow by crimping the outer circumferential surface of the large diameter portion.

2. The connector assembly for connecting pipes of claim 1, wherein a through-hole is formed in the body portion.

3. The connector assembly for connecting pipes of claim 2, wherein the through-hole is formed to have a length greater than a width.

4. The connector assembly for connecting pipes of claim 1, wherein a depressed groove is formed in the body portion.

5. The connector assembly for connecting pipes of claim 1, wherein the body portion and the sharp portion are formed of the same material, and wherein a bending strength of the body portion is lower than that of the sharp portion.

6. The connector assembly for connecting pipes of claim 1, wherein the body portion is formed in a shape that is curved downward.

7. The connector assembly for connecting pipes of claim 1, wherein the body portion is formed of a first material and the sharp portion is formed of a second material, wherein the first material comprises a bending strength lower than the second material.

8. The connector assembly for connecting pipes of claim 1, wherein the sealing member is formed with protrusions on the side surfaces.

9. The connector assembly for connecting pipes of claim 1, wherein the body portion and the sharp portion are formed to form an obtuse angle each other.

10. The connector assembly for connecting pipes of claim 1, wherein the sharp portions are dividedly formed by a plurality of slits.

11. The connector assembly for connecting pipes of claim 10, wherein the body portion is formed with a plurality of through-holes, and centers of the through-holes are formed so as to coincide with centers of the slits.

12. The connector assembly for connecting pipes of claim 10, wherein the body portion is formed with a plurality of through-holes, and the centers of the through-holes are formed so as to coincide with a center point between the slits adjacent to each another.

13. A connector assembly for connecting pipes comprising:
a connector formed with a hollow into which a pipe is inserted, a large diameter portion being formed on at least one side of both end portions of the hollow, the large diameter portion being formed to have a relatively large inner diameter and forming an housing space inside;
a ring-shaped sealing member provided within the housing space;
a grip member provided adjacent to the sealing member in the housing space; and
a partition member provided between the sealing member and the grip member to space the sealing member and the grip member apart from each other,
wherein the grip member has a body portion formed to contact along an inner circumferential surface of the large diameter portion, and a pair of sharp portions that is formed in shapes corresponding to each other to be bent from both sides of the body portion, and is formed so as to partially bite into the outer circumferential surface of the pipe inserted into the hollow by crimping the outer circumferential surface of the large diameter portion, and under the condition of crimping the outer circumferential surface of the large diameter, the body portion is bendingly deformed toward a central direction of the pipe and has a bending strength of the body portion that is lower than that of the sharp portions.

14. The connector assembly for connecting pipes of claim 13, wherein the partition member is formed in a shape having a square cross-section.

15. The connector assembly for connecting pipes of claim 13, wherein the partition member is formed such that a surface abutting against the grip member is inclined.

16. The connector assembly for connecting pipes of claim 13, wherein a height of the partition member is formed to be lower than a height of the housing space.

17. The connector assembly for connecting pipes of claim 13, wherein the body portion comprises a depressed groove.

18. The connector assembly for connecting pipes of claim 13, wherein the sharp portions are dividedly formed by a plurality of slits.

19. The connector assembly for connecting pipes of claim 18, wherein the body portion is formed with a plurality of through-holes, and centers of the through-holes are formed so as to coincide with centers of the slits.

20. The connector assembly for connecting pipes of claim 18, wherein the body portion is formed with a plurality of through-holes, and the centers of the through-holes are formed so as to coincide with a center point between the slits adjacent to each another.

* * * * *